United States Patent Office 3,267,062
Patented August 16, 1966

3,267,062
ESTER LACTONES AS PLASTICIZERS IN POLY-VINYL CHLORIDE COMPOSITIONS
Erhard J. Prill, Des Peres, and James C. Wygant, Creve Coeur, Mo., assignors to Monsanto Company, a corporation of Delaware
No Drawing. Original application Jan. 4, 1960, Ser. No. 34, now Patent No. 3,155,685, dated Nov. 3, 1964. Divided and this application Oct. 22, 1963, Ser. No. 318,099
10 Claims. (Cl. 260—30.4)

This is a divisional application from our copending parent application Serial No. 34, filed January 4, 1960, now U.S. Patent No. 3,155,685.

This invention relates to polyvinyl halide resin compositions containing a plasticizing amount of an ester lactone from the lactonization of unsaturated acid esters of alkenylsuccinic anhydrides and to the methods for producing such plasticized polyvinyl halide resin compositions.

The preparation of lactones from $\gamma$- and $\delta$-keto acids by reduction with sodium and alcohol or by use of a Raney-nickel catalyst is well known. The presence of other functional groups such as halo, carboxy, and the like substituted on the keto acids usually is detrimental to the formation of the lactone. Therefore, the formation of lactones substituted with an ester group, as well as other constituents, can not be accomplished in good yield by the processes known to the prior art.

The principal object of this invention is to provide polyvinyl halide resin compositions containing a plasticizing amount of ester-substituted gamma and deltalactones.

Another object of this invention is to provide methods for plasticizing polyvinyl halide resins by incorporating therewith a plasticizing amount of an ester-substituted lactone.

Other objects and advantages of this invention will be apparent to one skilled in the art upon studying this disclosure.

Our aforesaid parent application discloses and claims the process of making the ester-lactone compounds employed as plasticizers in this application.

In accordance with the invention of the aforesaid application, a 2-alkenylsuccinic anhydride is reacted with a monohydric alcohol to form an ester-substituted lactone. The reactants are initially reacted preferably in the absence of a catalyst and then an acid-type catalyst is employed to complete the reaction. The initial phase of the reaction involves opening of the cyclic ring of the 2-alkenylsuccinic anhydride and partial esterification thereof as illustrated by Equation 1:

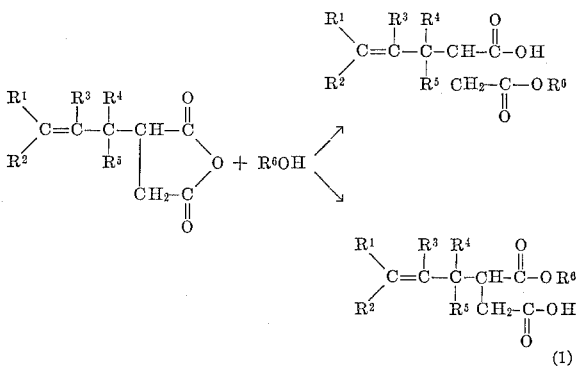

(1)

The reaction results primarily in the formation of only one acid-ester product; however, more than one acid-ester product is sometimes formed in the reaction, as shown in the above equation, depending upon where in the cyclic chain the opening thereof is effected. The final phase of the reaction requires the use of a catalyst and involves intramolecular cyclization of the acid-ester to form a lactone substituted with an ester group, as illustrated by Equation 2:

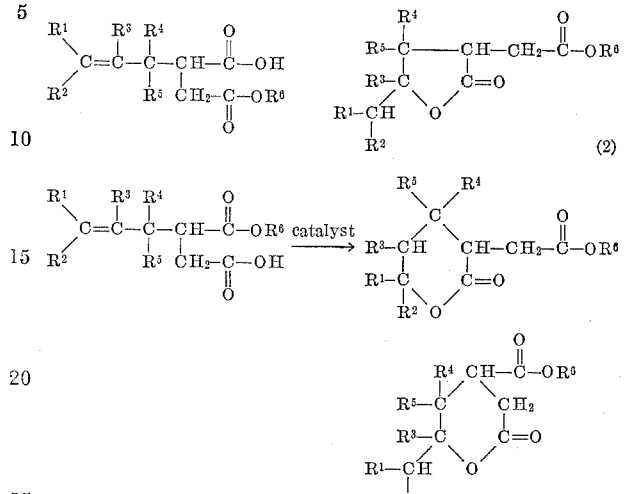

(2)

The use of the catalyst in the initial phase of the reaction tends to result in the formation of diesters, instead of acid-esters or partial esters, and the formation of the diester prevents the intramolecular cyclization in the final phase to form the ester lactone.

In the aforesaid formulas $R^1$, $R^2$, $R^3$, $R^4$, and $R^5$ are selected from the group consisting of hydrogen, hydrocarbyl, hydrocarbyloxy, halohydrocarbyl, halohydrocarbyloxy, hydrocarbyloxyalkyl, carboalkoxy, acyl, carboalkoxyalkyl, cyano, cyanohydrocarbyl, carboxy, carboxyalkyl, and acyloxy radicals of less than 32 carbon atoms, preferably up to 20 carbon atoms, and free of nonbenzenenoid unsaturation, each of said $R^1$, $R^2$, $R^3$, $R^4$ and $R^5$ being the same or different, and $R^6$ is selected from the group consisting of hydrocarbyl, hydrocarbyloxyalkyl, alkoxyethoxyalkyl, acyloxyalkyl, and halohydrocarbyl radicals of less than 18 carbon atoms, preferably at least 6 carbon atoms, and free of nonbenzenoid unsaturation. These ester-substituted lactones may be described as being valerolactones; the first lactone above being a $\gamma$-valerolactone, the second being a $\delta$-valerolactone, and the last being a $\delta$-methyl-$\delta$-valerolactone. Although all three lactones may be formed as products in the reaction, the predominant product is the $\gamma$-valerolactone.

In accordance with this invention, there are provided improved polyvinyl halide resin compositions comprising polyvinyl halide resin and a plasticizing amount of an ester-substituted lactone as defined hereinabove and preferably the ester lactones of the formula

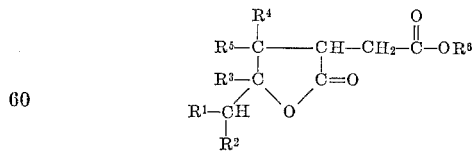

wherein $R^1$, $R^2$, $R^3$, $R^4$, $R^5$, and $R^6$ are as above defined.

Further, in accordance with this invention, there is provided a method for plasticizing polyvinyl halide resins by incorporating with said resins a plasticizing amount of an ester-substituted lactone as set out hereinabove.

The 2-alkenylsuccinic anhydride reactants suitable for the production of said ester-substituted lactones can have either a straight-chain or a branched-chain alkenyl group but the double bond of the alkenyl group must be located in the 2-position. For example, the alkenyl group can be a 2-propenyl, 2-methylallyl, 2-butenyl, 2-pentenyl, or the like. Succinic anhydrides substituted with a branched-chain alkenyl group, including alkenyl groups which are substituted with other groups besides those containing only carbon and hydrogen, are also very suitable reactants. Thus, the $R^1$, $R^2$, $R^3$, $R^4$, and $R^5$ radicals can be either hydrogen; hydrocarbyl radicals, including alkyl radicals such as methyl, ethyl, hexyl, decyl, undecyl, pentadecyl, tricosyl, hexacosyl, dotricontyl, isobutyl, 5-methylhexyl, and 2-methyl-decyl, aryl radicals such as phenyl, alkaryl radicals such as methylphenyl, diethylphenyl, isopropylphenyl and tert-amylphenyl; and aralkyl radicals such as benzyl, amylbenzyl, phenylethyl, and phenylpropyl; hydrocarbyloxy radicals, including alkoxy radicals such as methoxy, ethoxy, butoxy, isopentyloxy, n-dodecyloxy, n-octyloxy and ethylhexyloxy, alkylaroxy radicals such as octylphenoxy, dodecylphenoxy, methylphenoxy, and diethylphenoxy, aroxy radicals such as phenoxy, arylalkoxy radicals such as benzyloxy, methylbenzyloxy, phenylethoxy, phenylbutoxy and methylphenylethoxy; halohydrocarbyl radicals where the halogen is either chlorine, bromine, iodine or fluorine, including haloalkyl radicals such as 2-chloroethyl, 3,3-dibromobutyl, 3-iodo-5-ethylhexyl, and 2,3-difluorooctyl, haloaryl radicals such as 2-chlorophenyl, 2,4-dibromophenyl, 4-iodophenyl, 2,4-difluorophenyl, haloalkaryl radicals such as 2-chloro-4-methylphenyl, 2,4-dibromo-3-ethylphenyl, 2-iodo-4-methylphenyl, and 2-fluoro-4-propylphenyl, haloaralkyl radicals such as chlorobenzyl and bromobenzyl; halohydrocarbyloxy radicals including haloalkoxy radicals such as chloromethoxy, bromobutoxy, iodoethoxy, and fluoromethoxy, haloalkylaroxy radicals such as chlorooctylphenoxy and bromooctylphenoxy, haloaroxy radicals such as chlorophenoxy, bromophenoxy, iodophenoxy, and fluorophenoxy, and haloarylalkoxy radicals such as chlorobenzyloxy and bromobenzyloxy; hydrocarbyloxyalkyl radicals including alkoxyalkyl radicals such as 2-methoxyethyl, 3-ethoxy-n-propyl, 4-butoxybutyl, and 2,3-di-n-octyloxypropyl, aroxyalkyl radicals such as phenoxymethyl and phenoxyethyl, alkylaroxyalkyl radicals such as methylphenoxyethyl and octylphenoxymethyl radicals, and arylalkoxyalkyl radicals such as benzyloxymethyl, phenylethoxymethyl and methylphenylbutoxyethyl; carboalkoxy radicals such as carbomethoxy and carboethoxy; acyl radicals such as formyl, acetyl, propionoyl, heptanoyl, decanoyl, benzoyl and phenylacetyl; carboalkoxyalkyl radicals such as carboethoxyethyl, carbo-n-propyloxybutyl, carbobutoxypropyl, carbomethoxyamyl and carbohexoxyethyl; cyano radicals; cyanohydrocarbyl radicals including cyanoalkyl radicals such as cyanomethyl and cyanopropyl and cyanoaryl radicals such as cyanophenyl and dicyanophenyl; carboxy radicals; carboxyalkyl radicals such as carboxyethyl, carboxybutyl, carboxyoctyl, carboxydecyl, and 3-carboxybutyl; and acyloxy radicals such as formyloxy, acetyloxy, propionoyloxy, benzoyloxy, heptanoyloxy and decanoyloxy.

This invention is not limited by the number of carbon atoms in each of the $R^1$, $R^2$, $R^3$, $R^4$ and $R^5$ radicals and radicals containing any number of carbon atoms can be used; however, preferably radicals having fewer than 32 carbon atoms, more preferably up to 20 carbon atoms, and more preferably still up to 10 carbon atoms, are employed. Also, other hydrocarbyl radicals can also be employed in the process of this invention provided the hydrocarbyl radicals are free of non-benzenoid unsaturation; that is, olefinic and acetylenic unsaturation.

The 2-alkenylsuccinic anhydride reactants wherein the alkenyl group is a branched-chain structure are preferably produced by the addition of an olefin or a lower olefin dimer, trimer, tetramer or pentamer to maleic anhydride as is well known to those skilled in the art. These lower olefins, such as propylene, butylene, and isobutylene, form polymers which result from polymerization of the olefin with sulfuric acid or metallic halides or which result from the simultaneous dehydration and polymerization of the tertiary alcohols by concentrated sulfuric acid. Thus, tetrapropenylsuccinic anhydride is formed by the addition of propylene tetramer to maleic anhydride and, in a similar manner, diisobutenylsuccinic anhydride is formed from diisobutylene dimer and maleic anhydride.

Illustrative examples of suitable monohydric alcohols, $R^6OH$, include the hydrocarbyl alcohols such as the alkyl alcohols, e.g., methyl, ethyl, isopropyl, hexyl, decyl, dodecyl, tridecyl, and octadecyl alcohol, the cycloalkyl alcohols, e.g., cyclopentyl and cyclohexyl alcohols, the (cycloalkyl)alkyl alcohols, e.g., cyclohexylethyl, cyclohexylbutyl, and cyclopentylpropyl alcohols, the (alkyl)cycloalkyl alcohols, e.g., 1-methylcyclohexylmethyl, 1-(1'-methylcyclohexyl) - 1 - ethyl, and 1-(2'-ethylcyclohexyl)-3-propyl alcohols, the aryl alcohols such as phenyl alcohol, the alkaryl alcohols, e.g., methylphenyl, ethylphenyl, and dipropylphenyl alcohols, and the aralkyl alcohols, e.g., benzyl, butylbenzyl, phenylethyl, and phenylbutyl alcohols; the hydrocarbyloxyalkyl alcohols such as the alkoxyalkyl, e.g., 2-ethoxyethyl, 2-butoxyethyl, 2-methoxyethyl and 2-isopropyloxyethyl alcohols and the aroxyalkyl alcohols, e.g., phenoxymethyl and phenoxyethyl alcohols; the alkoxyethoxyalkyl alcohols, e.g., 2-(methoxyethoxy)ethyl, 2-(ethoxyethoxy)ethyl and 2-(butoxyethoxy)ethyl alcohols; the acyloxyalkyl alcohols, e.g., acetoxyethyl, benzoyloxybutyl, and phenacetoxyethyl alcohols; and the halohydrocarbyl alcohols, such as the haloalkyl alcohols, e.g., 2-chloroethyl, 2-bromopropyl, 4-iodobutyl, and 3-fluoropropyl alcohols, the halocycloalkyl alcohols, e.g., chlorocyclopentyl, bromocyclohexyl, and iodocyclohexyl alcohols, the halo(cycloalkyl)alkyl alcohols, e.g., 2-chlorocyclohexylethyl, and 2-bromocyclohexylbutyl alcohols, the halo(alkyl)cycloalkyl alcohols, e.g., 1-(2'-chloro-3'-methylcyclohexyl)-3-propyl and 1-(1'-bromo-2'-ethylcyclohexyl) - 1 - ethyl alcohols, the haloaryl alcohols such as 2-chlorophenyl, 3-bromophenyl, and 2,4-diiodophenyl alcohols, the haloalkaryl alcohols, e.g., 2-chloro-3-methylphenyl and 2-bromo-4-ethylphenyl alcohols, and the haloaralkyl alcohols, e.g., 2-chlorobenzyl and 2-bromo-4-butylbenzyl alcohols.

Although the alcohol used in the process of this invention may have as many as 32 carbon atoms in the molecule, preferably the alcohol is one which has at least 6, but less than 18 carbon atoms per molecule. The alcohol may be a straight-chain or a branched-chain one, and can be either a primary, secondary or tertiary alcohol. A very suitable type of branched-chain alcohol is the "Oxo" type alcohol produced by oxonation of an olefin or a lower olefin dimer, trimer, tetramer, or pentamer with carbon monoxide and hydrogen at a temperature between about 250° C. and 450° C. under a pressure of about 150–400 atm. in the presence of a cobalt or similar catalyst to form an aldehyde which is then catalytically hydrogenated to form an alcohol as is well known to those skilled in the art. For example, tridecyl alcohol is prepared from propylene tetramer or isobutylene trimer and carbon monoxide and hydrogen whereas hexadecyl alcohol is prepared from propylene pentamer and carbon monoxide and hydrogen.

The esterification and intramolecular cyclization reactions are usually carried out at from about room temperature to a temperature below about 150° C. because the use of more elevated temperatures results in the formation of a substantial amount of the diester of the succinic anhydride. The reaction can be conducted at temperatures as low as approximately room temperature, e.g., 20° C., particularly when using low molecular weight alkenylsuccinic anhydrides and alcohols; however, it is usually desirable to use a temperature above room temperature in order to have relatively short reaction times. Ordinarily, these reactions are carried out at substantially atmospheric pressure although pressures above atmospheric may be employed with the more volatile reactants.

Usually, stoichiometric amounts of the alkenylsuccinic anhydride and alcohol reactants are maintained in the reaction zone. However, it is sometimes desirable to use an excess of the alcohol reactant in order to drive the anhydride-opening step to completion. It is also possible to use an excess of the alkenylsuccinic anhydride although the use of an excess of this reactant is usually not desirable since the unreacted alkenylsuccinic anhydride must be recovered in the purification step.

The partial esterification step of the process should be conducted in a catalyst-free system since the use of a catalyst promotes the addition of 2 moles of the alcohol reactant to each mole of the succinic anhydride reactant, thereby effecting complete esterification of the succinic anhydride and the formation of a diester. The formation of the diester product is undesirable since the diester cannot be intramolecularly cyclized to form the desired lactone.

The intramolecular cyclization step involved in the process must be carried out in the presence of an acid-type catalyst in order to effect formation of the lactone. Suitable catalysts include the mineral acids such as hydrochloric acid, sulfuric acid, perchloric acid, and phosphoric acid; the sulfonic acids such as the alkanesulfonic acids and the arylsulfonic acids; the Lewis type acids such as aluminum chloride, boron trifluoride, antimony trichloride, and titanium tetrachloride; low molecular weight aliphatic carboxylic acids such as formic and propionic acids; and sulfonic acid type ion exchange resin materials, such as cross-linked sulfonated polystyrene which is commercially available as Dowex-50. The alkanesulfonic acid catalysts are preferably the lower alkanesulfonic acids containing from 1 to 12 carbon atoms, for example, methanesulfonic acid, ethanesulfonic acid, propanesulfonic acid, and butanesulfonic acid. If desired, a mixture of lower alkanesulfonic acids can be used and such a mixture containing methane, ethane, and propanesulfonic acids is commercially available. Ordinarily, the alkanesulfonic acid will comprise from 92% to 95% sulfonic acid, from 1 to 2% sulfuric acid, and from 3 to 6% water. The arylsulfonic acid catalyst which can be used in the process include the benzenesulfonic acids, toluenesulfonic acid, and chlorobenzenesulfonic acids, with p-toluenesulfonic acid and 4-chloro-benezenesulfonic acid being preferred. The amount of catalyst present in the reaction zone can be varied over wide limits depending upon the nature of the reactants and the catalyst used. The amount of catalyst used is also determined to a considerable extent by the temperature selected for conducting the reaction. Thus, at higher temperatures the amount of catalyst required in the reaction zone is smaller than when lower temperatures are used and the use of excessive amounts of catalyst at the more elevated temperatures will promote the formation of undesired side products. Ordinarily, the amount of catalyst used will be between about 0.1% up to 5% by weight of the amount of the alkenyl succinic anhydride reactant.

The partial esterification and the intramolecular cyclization steps involved in the reaction can be carried out either batchwise or in a continuous manner. If the reactions are carried out batchwise, the partial esterification step is conducted first and after the completion of this step, the catalyst is added to the system in order to effect the intramolecular cyclization. Ordinarily, the partial esterification step will be completed in a period of time of less than approximately ½ hour; however, substantially longer periods of time may be required in some cases with particular reactants. The partial esterification step can be conducted over long periods of time if a suitable low temperature is used and a reaction time as long as 17 hours has been employed without substantial formation of the diester product. After completion of the partial esterification step, the catalyst can be added directly to the reaction zone without effecting any changes in the reaction conditions. If desired, the reaction mixture obtained in the esterification step can be subjected to a separation step to effect removal of any unconverted reactants. Although the catalyst promotes the formation of the diester product when the succinic anhydride and the alcohol reactants are brought together in the presence of the catalyst, there is no substantial formation of the diester product in the intramolecular cyclization step, depending upon the nature of the succinic anhydride, even though there is an excess of the alcohol reactant present in the reaction zone because the intramolecular cyclization step occurs more readily than the partial esterification step under these conditions.

If the process is carried out in a continuous manner the catalyst is preferably added to the system at a point after substantial completion of the partial esterification step so as not to be present in the system at a place where the partial esterification of the alkenylsuccinic anhydride and the alcohol takes place.

After completion of the intramolecular cyclization step, the reaction mixture is washed first with water to remove the acid catalyst and then with a dilute alkaline solution to remove any remaining catalyst and unreacted acid ester and/or anhydride. Suitable dilute alkaline materials useful for this purpose include aqueous sodium hydroxide, aqueous sodium carbonate, and aqueous calcium hydroxide solutions. After washing, the recovered material is purified in the usual manner by distillation, solvent extraction, or selective adsorption procedures.

The ester lactone products are stable liquid compounds which range in color from colorless to a light yellow and which range in viscosity from very fluid to very viscous. The boiling points of these compounds are very high, usually being above 200° C. These ester lactones have good solvent properties and are soluble in benzene, alcohols, ethers, ketones and the like. Generally, these ester lactones are insoluble in water although the low molecular weight lactones are somewhat soluble in water.

The ester lactones defined hereinabove have now been found to have extensive use as plasticizers for various synthetic resins, particularly the polyvinyl halide resins such as polyvinyl chloride, to form softened compositions of increased resiliency and flexibility which is retained at low temperatures as well as at high temperatures. The said ester lactones are also compatible with other polymers such as polyvinyl butyral, cellulose acetate, cellulose acetate butyrate, polystyrene and certain polyacrylates.

As plasticizers, the ester γ-valerolactone products are particularly preferred and are fully compatible with vinyl halide resins as is apparent by visual inspection of the plasticized compositions. Furthermore, the ester γ-valerolactones of this invention produce flexible polyvinyl halide compositions at room temperature as well as at lower temperatures where many plasticized polyvinyl halide compositions become very brittle and useless. In addition, the plasticized polyvinyl halide compositions of this invention do not become brittle and useless with age or upon heating because the lactones have very low volatility and are relatively insoluble in water.

The following examples are illustrative of the preparation of suitable ester lactone plasticizer compounds for incorporation in polyvinyl halide and other polymer compositions, but it will be understood that such examples are not to be regarded as a limitation on the generic disclosure set out hereinabove.

EXAMPLE 1

In this example, an ester-lactone was prepared from tetrapropenylsuccinic anhydride and 2-ethylhexanol using ½ mole of each reactant. The reactants were placed in a small flask and heated at a temperature of 110° C. for 1 hour with the formation of a clear yellow solution. Immediately thereafter, 2 ml. of concentrated sulfuric acid was added to the hot reaction flask and the heating continued for a period of 16 hours while maintaining a temperature of 105° C. The dark brown solution formed was diluted with 100 ml. of ether and washed with 100 ml. of water followed by washing with 100 ml. of a 5% solution of sodium hydroxide and another washing with 100 ml. portion of water. The washed solution obtained was dark brown in color and was distilled in a still head to effect removal of the ether and the entrained water. The residue was then distilled at reduced pressure to obtain 146.8 g. of the desired product boiling at 186–191° C./0.09–0.1 mm. and having a refractive index $n_D^{25}$ 1.4623. The yield of the ester-lactone in this example amounted to 74.2%. The product had an analysis of 72.01% by weight carbon and 10.4% by weight hydrogen as compared with an analysis of 72.68% by weight carbon and 11.18% by weight hydrogen calculated for $C_{24}H_{44}O_4$. Infrared analysis showed that the product was free of tetrapropenylsuccinic anhydride.

EXAMPLE 2

In this example, an ester-lactone was prepared from tetrapropenylsuccinic anhydride and "Oxo" decyl alcohol using 0.5 mole of each reactant. The reactants were placed in a small flask and heated at a temperature of 110° C. for a period of 1.25 hours. Thereafter, 2 ml. of concentrated sulfuric acid was added to the hot reaction flask and the heating was continued overnight, with stirring, while maintaining the temperature in the range of 107–110° C. After cooling, the dark colored reaction mixture was diluted with 100 ml. of ether and washed with a 100 ml. portion of 5% sodium hydroxide solution followed by washing with a 100 ml. portion of water. The washed material was then distilled through a still head to remove ether and any dissolved water. The residue was then distilled under vacuum to obtain the ester-lactone boiling at 198–235° C./0.22–0.19 mm. and having a refractive index $n_D^{25}$ 1.4622. The product amounted to 172.6 g.; a yield of 81.4%. Analysis of the product was 75.1 wt. percent carbon and 11.92 wt. percent hydrogen as compared with 73.53 wt. percent carbon and 11.39 wt. percent hydrogen calculated for $C_{26}H_{48}O_4$.

EXAMPLE 3

In this example, 75 g. (0.282 mole) of tetrapropenylsuccinic anhydride was reacted with 57 g. (0.282 mole) of tridecyl alcohol having a boiling point of 129–137° C./10 mm. The reactants were heated in a reaction flask for a period of 1.5 hours at a temperature of 100–120° C. At the end of this time, 2 ml. of concentrated sulfuric acid was added and the heating was continued for 17 hours while maintaining the temperature at 122° C. At the end of this time, the dark brown reaction mixture was diluted with 100 ml. of ether and washed with 100 ml. portions each of water, 5% solution of sodium hydroxide, and water. The washed solution was then distilled through a still head to remove ether and the residue distilled under vacuum to obtain 91.4 g. of the product ester-lactone boiling at 215–240° C./0.17–0.11 mm. and having a refractive index $n_D^{25}$ 1.4651. The carbon and hydrogen analysis of this product were found to be 74.20 wt. percent and 10.88 wt. percent, respectively, as compared with calculated values of 74.62 wt. percent carbon and 11.66 wt. percent hydrogen for $C_{29}H_{54}O_4$.

EXAMPLE 4

In this example, 41 g. (0.133 mole) of pentapropenylsuccinic anhydride was reacted with 27 g. (0.133 mole) of redistilled tridecyl alcohol. The reactants were heated in a reaction flask at a temperature of 120° C. for a period of 1.5 hours. Thereafter, 1 ml. of concentrated sulfuric acid was added to the reaction mixture and the heating was continued for a period of 17 hours at a temperature of 118° C. At the end of this time, the reaction mixture was diluted with 50 ml. of ether and then washed with 50 ml. portions each of water, 5% sodium hydroxide solution and water. After distillation through a still head to remove the ether, the residue was distilled under vacuum to obtain 43.2 g. of the product ester-lactone boiling at 217–260° C./0.12 mm. and having a refractive index $n_D^{25}$ 1.4677. The carbon and hydrogen analyses of the product were found to be 75.57 wt. percent and 11.76 wt. percent, respectively, as compared with calculated values of 75.53 wt. percent carbon and 11.89 wt. percent hydrogen for $C_{32}H_{60}O_4$. The product was a yellow oil and was obtained in 63.8% yield.

EXAMPLE 5

In this example, 80.3 g. (0.30 mole) of tetrapropenylsuccinic anhydride was reacted with 34 ml. of benzyl alcohol. These reactants were heated in a reaction flask at a temperature of 120° C. for 1 hour. Thereafter, the mixture was distilled under reduced pressure to remove the excess alcohol amounting to 4.6 g. Concentrated sulfuric acid in an amount of 1 ml. was then added to the reaction mixture as a catalyst and the heating continued for a period of 5 hours while maintaining the temperature at approximately 120° C. At the end of this time, the dark colored reaction mixture was diluted with 200 ml. of benzene and washed successively with 100 ml. of water, 100 ml. of 5% sodium hydroxide solution, 100 ml. of 5% sodium hydroxide solution and 100 ml. of water. The benzene solution was then distilled through a still head to obtain 39.2 g. of the ester-lactone boiling at 191–248° C./0.1 mm. having a refractive index $n_D^{25}$ 1.5053. Analysis of this product was found to be 74.42 wt. percent carbon and 9.15 wt. percent hydrogen as compared with values of 73.76 wt. percent carbon and 9.15 wt. percent hydrogen calculated for $C_{23}H_{34}O_4$. The proposed structure for the ester-lactone was confirmed from an inspection of the infrared spectrum of the compound.

EXAMPLE 6

In this example, 75 g. (0.282 mole) of tetrapropenylsuccinic anhydride was reacted with 47 g. (0.282 mole) of 2-hydroxyethyl benzoate. The reactants were heated in a reaction flask for a period of 1.5 hours at a temperature of 120° C. At the end of this time, 2 ml. of concentrated sulfuric acid was added and the mixture was further heated for a period of 4 hours at a temperature of 120° C. The thick, dark reaction mixture obtained was then diluted with 100 ml. of ether and washed with 100 ml. portions each of water, 5% sodium hydroxide solution, and water. The washed product was distilled through a still head to remove ether and the residue obtained was then distilled under vacuum to obtain 42.8 g. of the product ester-lactone boiling at 238–270° C./0.15 mm. and having a refractive index $n_D^{25}$ 1.5003. The carbon and hydrogen analyses of the product were found to be 69.57 wt. percent and 8.27 wt. percent, respectively, as compared with values of 69.42 wt. percent and 8.39 wt. percent, respectively, calculated for $C_{25}H_{36}O_6$.

EXAMPLE 7

In this example, 200 g. (0.752 mole) of tetrapropenylsuccinic anhydride was reacted with 119 g. (0.752 mole) of "Oxo" decyl alcohol. The reactants were heated in a reaction flask at a temperature of 120° C. for a period of 2.5 hours. Thereafter, anhydrous hydrogen chloride was bubbled into the reaction mixture maintained at a temperature of 120° C. for a period of 2 hours. At this time, the introduction of hydrogen chloride was discontinued and the reaction mixture was heated for an additional 16.5 hours with stirring. The dark brown reaction mixture obtained was then washed with dilute sodium hydroxide and water and distilled in three passes through a film still to obtain 142 g. of the ester-lactone product boiling at 180° C./0.04 mm. and having a refractive index $n_D^{25}$ 1.4639. The product was yellow in color and had carbon and hydrogen analyses of 73.66 wt. percent and 11.70 wt. percent respectively, as compared with values of 73.53 wt. percent and 11.39 wt. percent respectively, calculated for $C_{26}H_{48}O_4$.

EXAMPLE 8

In this example, 280 g. of tetrapropenylsuccinic anhydride was reacted with 200 g. of tridecanol. These reactants were heated in a reaction flask at a temperature of 120° C. for a period of 1.25 hours. Thereafter, the reaction mixture was cooled to 55° C. and 2.0 ml. of 72% perchloric acid added. The reaction mixture was then heated for a period of 2 hours and 20 minutes at a temperature up to 120° C. During this second heating step, the drop in acidity of the reaction mixture was checked periodically by titrating 0.5 ml. portions of the reaction mixture with standard sodium hydroxide. Upon completion of the reaction, the dark brown colored reaction mixture was dissolved in 230 ml. of ether and washed successively with 300 ml. of 5% sodium hydroxide solution, 100 ml. of water and 50 ml. of water. The combined water phases were then washed with two 50 ml. portions of ether. The combined ether solutions were distilled through a still head to obtain 335 g. of a fraction boiling at 208–250° C./0.4–0.38 mm. This fraction was redistilled to obtain a 264 g. fraction boiling at 213–227° C./0.28–0.20 mm. This fraction was then heated with 1.3 g. of activated charcoal at a temperature of 75–80° C. for a period of 1 hour. At the end of this time, the charcoal was removed by filtration to obtain 253 g. of the ester-lactone which is a light yellow colored liquid. Analysis of the product was found to be 74.67 wt. percent carbon and 11.87 wt. percent hydrogen as compared with calculated values of 74.62 wt. percent carbon and 11.66 wt. percent hydrogen, calculated for $C_{29}H_{54}O_4$.

EXAMPLES 9–14

In these examples, the plasticizer properties of several of the representative ester-lactone products disclosed hereinabove were evaluated when employed in polyvinyl chloride resins. These resin compositions comprised 60 parts of the polyvinyl chloride resin and 40 parts of the candidate plasticizer, including ¼ phr. of dibasic lead stearate as a heat stabilizer. These materials were mixed on a rolling mill to form a homogeneous blend and visual inspection of the compositions indicated that all of the candidate plasticizers were compatible with polyvinyl chloride. Molded sheets from all of the milled mixtures were clear and transparent. The low-temperature flex point, volatility, water extraction, and kerosene extraction for these compositions in the form of a molded sheet were determined and are reported in the following table:

In these tests, the low temperature flexibility was determined according to the Clash-Berg method wherein the tortional flexibility of the sample is determined at various temperatures. This value is defined as the lower temperature limit for use of the plasticized compositions as an elastomer. The volatility was determined according to the Carbon Absorption Method of the Society of the Plastics Industry. The amount of water extraction and kerosene extraction was determined by immersion of a sample in distilled water and kerosene, respectively, for a period of 24 hours, followed by a determination of the loss in weight of the sample.

*Table*

| Example | Plasticizer | Low Temp. Flex, °C. | Volatility, Percent Lost | Water Extraction, Percent Sol. Matter Lost | Kerosene Extraction, Percent Plasticizer Lost |
| --- | --- | --- | --- | --- | --- |
| 9 | Ester lactone from tetrapropenylsuccinic anhydride and 2-ethylhexanol. | −22 | 3.0 | | (¹) |
| 10 | Ester lactone from tetrapropenylsuccinic anhydride and "Oxo" decyl alcohol. | −21 | 1.94 | | 1.0 |
| 11 | Ester lactone from tetrapropenylsuccinic anhydride and "Oxo" tridecanol. | −18 | 1.7 | 0.09 | 0.02 |
| 12 | Ester lactone from pentapropenylsuccinic anhydride and "Oxo" tridecanol. | −18 | 1.4 | 0.07 | |
| 13 | Ester lactone from tetrapropenylsuccinic anhydride and benzyl alcohol. | −0.5 | 2.7 | | 1.2 |
| 14 | Ester lactone from tetrapropenylsuccinic anhydride and 2-hydroxyethyl benzoate. | +7 | 1.4 | 0.15 | 0.91 |

¹ Slight gain.

While the above Examples 9 to 14 show only compositions in which the ratio of plasticizer to ester-lactone product in parts by weight is 40:60, this ratio being employed in order to get comparable efficiencies, it will be understood that the ratio of ester-lactone product to polyvinyl chloride can be varied over a wide range, depending upon the properties desired in the vinyl resin product. For some purposes, a plasticizer content of from only about 2 to about 5% by weight would be desirable; however, usually a plasticizer content above about 10% by weight is used. The present ester-lactone products were found to be compatible with polyvinyl chloride over wide ranges in concentration up to 50% of ester-lactone product based on the total weight of the plasticizer composition.

Whereas all of the ester-lactones disclosed hereinabove are suitable as plasticizers for vinyl halide polymers, the ester-lactones prepared from the higher monohydric alcohols, i.e., those wherein $R^6$ has from 6 to 17 carbon atoms, are preferred to provide plasticizer compositions characterized by lower volatility and greater resistance to water extraction than the lower ester lactones.

The invention has been described particularly with reference to the use of the disclosed ester-lactone products as plasticizers for polyvinyl chloride, but these ester-lactone products are also advantageously employed as plasticizers for copolymers of vinyl chloride, for example, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers and the like. Preferably, such copolymers have a vinyl chloride content of at least about 70% by weight and up to about 30% by weight of the copolymerizable monomer.

The plasticized polyvinyl halide compositions of the present invention have good thermal stability; however, it may be desirable for various purposes to include known stabilizers in the plasticized compositions. Inasmuch as the present ester-lactone products are substantially unreactive with the commercially available heat- and light-stabilizers which are commonly employed with polyvinyl halide resins, the presence of such materials in the plasticized compositions does not impair the valuable properties of the ester-lactone products.

The disclosed ester-lactones, either singly or in combination, can be incorporated with the polyvinyl halide resin to form a plasticized polyvinyl halide resin by working said materials together on mill rolls, i.e., by milling, or by solution compounding, i.e., dissolving the ester-lactone plasticizer and polyvinyl halide resin together in a mutual solvent and then allowing the solvent to evaporate, or by any other conventional technique. It will be understood that colors, dyes, extenders, pigments, fillers, reinforcing agents, and other compounding ingredients can be included in the plasticized polyvinyl halide composition if it is so desired.

Reasonable variation and modification of the invention as described are possible, the essence of which is that there have been provided: (1) methods for plasticizing polyvinyl halide resins by incorporating therewith a plasticizing amount of the disclosed class of ester-lactones, and (2) plasticized polyvinyl halide compositions containing a plasticizing amount of said ester-lactones.

We claim:

1. A resinous composition comprising a major portion of a vinyl chloride polymer, selected from the group consisting of a polyvinyl chloride homopolymer and copolymers of vinyl chloride with a minor portion of an ethylenically unsaturated monomer copolymerizable therewith, plasticized with an ester-substituted lactone of a 2-alkenylsuccinic anhydride and a monohydric alcohol having less than 18 carbon atoms, wherein said lactone includes only gamma- and delta-lactones defined by the structural formula

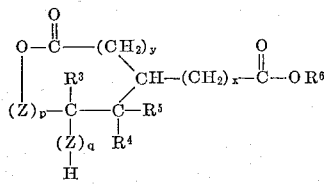

wherein $p$, $q$, $x$, and $y$ each are integers from 0 to 1; the sum of $x$ and $y$ is 1; the sum of $p$ and $q$ is 1; $Z$ is the divalent radical

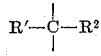

each of $R^1$, $R^2$, $R^3$, $R^4$, and $R^5$ are free from non-benzenoid unsaturation and are selected from the group consisting of hydrogen atoms and hydrocarbyl radicals containing up to 20 carbon atoms; and $R^6$ is the non-hydroxy moiety of said alcohol, wherein the ester-substituted lactone is present in an amount of from about 2 to about 50 weight percent of the resinous composition.

2. A resinous composition of claim 1, wherein the vinyl chloride polymer is a polymer of at least 70 weight percent of vinyl chloride and up to 30 weight percent of an ethylenically unsaturated comonomer copolymerizable therewith.

3. The resinous composition of claim 1, wherein the non-hydroxy moiety of the alcohol contains from 6 to 17 carbon atoms and the ester-lactone is present in an amount of from about 10 to about 50 weight percent of the total resinous compositions.

4. The resinous composition of claim 3, wherein the ester-lactone is

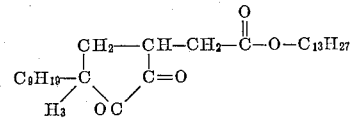

5. The resinous composition of claim 3, wherein the ester-lactone is

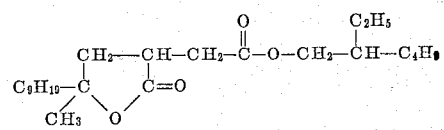

6. The resinous composition of claim 3, wherein the ester-lactone is

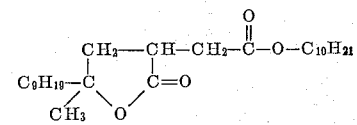

7. The resinous composition of claim 3, wherein the ester-lactone is

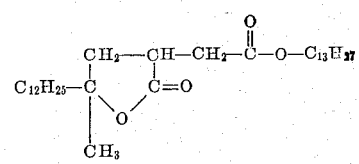

8. The resinous composition of claim 3, wherein the ester-lactone is

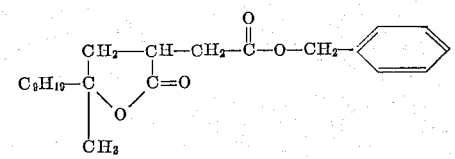

9. The resinous composition of claim 3, wherein the ester-lactone is

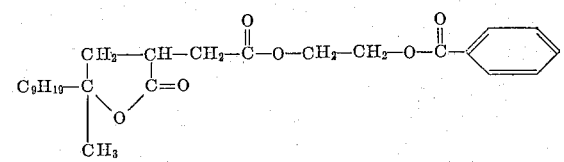

10. A resinous composition of claim 2, wherein $R^6$ is a hydrocarbyl radical, free from non-benzenoid unsaturation, containing from 6 to 17 carbon atoms and the ester-lactone is present in an amount of from about 10 to about 50 weight percent of the total resinous composition.

References Cited by the Examiner

UNITED STATES PATENTS

| | | | |
|---|---|---|---|
| 2,598,803 | 6/1952 | Ladd et al. | 260—30.4 |
| 2,863,877 | 12/1958 | Wheeler et al. | 260—30.4 |
| 3,056,802 | 10/1962 | Phillips et al. | 260—30.4 |

MORRIS LIEBMAN, *Primary Examiner.*

L. T. JACOBS, *Assistant Examiner.*